United States Patent [19]

Shemenski et al.

[11] 4,446,198
[45] May 1, 1984

[54] COPPER-ZINC-IRON TERNARY ALLOY COATED STEEL WIRE REINFORCERS IN TIRES

[75] Inventors: Robert M. Shemenski, North Canton; Dong K. Kim, Akron; Thomas W. Starinshak, Wadsworth, all of Ohio

[73] Assignee: The Goodyear Tire & Rubber Company, Akron, Ohio

[21] Appl. No.: 530,281

[22] Filed: Sep. 8, 1983

[51] Int. Cl.³ .................. B32B 15/18; B32B 15/06
[52] U.S. Cl. .................. 428/625; 428/677; 152/359; 156/124
[58] Field of Search .......... 428/625, 677; 152/359; 156/124

[56] References Cited

U.S. PATENT DOCUMENTS

| | | | |
|---|---|---|---|
| 2,870,526 | 1/1959 | Adler | 428/625 |
| 2,939,207 | 6/1960 | Adler | 428/625 |
| 3,749,558 | 7/1973 | Dillenschneider | 428/677 |
| 3,936,536 | 2/1976 | Brock | 156/124 |
| 3,961,740 | 6/1976 | Nakamoto et al. | 428/625 |
| 4,018,570 | 4/1977 | Nakamoto et al. | 152/359 |
| 4,068,041 | 1/1978 | Swarts | 428/625 |
| 4,192,694 | 3/1980 | Rye | 156/124 |
| 4,218,517 | 8/1980 | Van Ooij | 428/625 |
| 4,226,918 | 10/1980 | Friend | 428/625 |
| 4,255,496 | 3/1981 | Haemers | 428/625 |
| 4,333,785 | 6/1982 | Erickson | 428/625 |
| 4,347,290 | 8/1982 | Haemers | 428/625 |

FOREIGN PATENT DOCUMENTS 2039580A  8/1980  United Kingdom ............ 152/359

*Primary Examiner*—Veronica O'Keefe
*Attorney, Agent, or Firm*—Alvin T. Rockhill

[57] ABSTRACT

This invention reveals a steel wire element useful in the reinforcement of rubber articles in which the steel wire is provided with an adhesive coating comprising a ternary brass alloy containing about 55 percent to about 75 percent by weight copper, about 15 to about 45 percent by weight zinc, and about 0.1 to about 10 percent by weight iron. Preferably this ternary brass alloy will contain about 1 to 5 percent by weight iron. The steel wire elements of this invention are useful in the reinforcement of vehicle tires, power transmission belts, conveyor belts, hoses, and the like.

17 Claims, No Drawings

COPPER-ZINC-IRON TERNARY ALLOY COATED STEEL WIRE REINFORCERS IN TIRES

BACKGROUND OF THE INVENTION

It is frequently desirable to reinforce rubber articles, for example, tires, conveyor belts, power transmission belts, timing belts, hoses, and the like products, by incorporating therein steel reinforcing elements. Pneumatic vehicle tires are often reinforced with cords prepared from brass coated steel filaments. Such tire cords are frequently composed of high carbon steel or high carbon steel coated with a thin layer of brass. Such a tire cord can be a monofilament, but normally is prepared from several filaments which are stranded together. In most instances, depending upon the type of tire being reinforced, the strands of filaments are further cabled to form the tire cord.

In order for rubber articles which are reinforced with steel wire elements to function effectively it is imperative that good adhesion between the rubber and the steel cord be maintained. Steel is very prone to oxidation, which even in minor degrees is highly deleterious to rubber-metal adhesion. Thus, generally steel wire reinforcement elements are coated with brass in order to facilitate rubber-metal adhesion. It is generally agreed by those skilled in the art that adhesion of rubber to brass-plated steel wire is dependent upon a bond between the copper in the brass and sulfur in the rubber. When such brass coated steel reinforcing elements are present in the rubber composition during vulcanization, it is believed that bonds between the rubber and steel reinforcement gradually form due to a chemical reaction between the brass alloy and the rubber at the interface forming a bonding layer. At some point in the vulcanization procedure a maximum number of bonds is obtained. After this maximum is achieved the number of bonds present begins to decrease, probably by secondary reactions which decompose the layer. Subsequent to vulcanization and during the further lifetime of the steel reinforced article, these reactions continue at much lower rates by heat aging, for example, in a running tire, and this together with oxidative degradation of the rubber itself, contributes to further destruction of the bond. The temperature and duration of vulcanization must be well adapted to the metallic-coating in order to maximize rubber to metal adhesion.

As a general rule vulcanization temperatures in excess of 163° C. (325° F.) are detrimental to good rubber to brass adhesion. Thus, high temperature cure cycles have traditionally resulted in poor rubber to metal adhesion. For this reason high temperature cure cycles have not normally been employed to vulcanize rubber articles containing brass coated steel elements as reinforcements.

The amount of time needed to cure a rubber article decreases with increasing cure temperatures. Thus, by increasing cure temperatures, cure cycles can be reduced in duration. It is, therefore, possible to reduce the amount of time required in manufacturing vulcanized rubber articles by utilizing higher cure temperature.

By practicing this invention rubber articles which are provided with ternary iron-brass steel reinforcing elements can be cured at high temperatures while maintaining excellent rubber to metal adhesion. In many cases by practicing this invention, rubber to metal adhesion properties can be improved in metal reinforced articles which are cured using either a standard cure temperature or a high temperature cure. The practice of this invention generally results in both improved original adhesion and aged adhesion properties.

SUMMARY OF THE INVENTION

This invention reveals a ternary iron-brass alloy that is useful for coating steel reinforcing elements that are used to reinforce rubber articles. The ternary iron-brass alloy coatings of this invention substantially improve rubber to metal adhesion in articles wherein they are employed to coat metal reinforcing elements. In some cases the ternary iron-brass alloy coatings of this invention make it possible to cure rubber articles containing metal reinforcing elements coated therewith at higher temperatures than would normally be possible using standard brass alloys to coat the metal reinforcing elements.

This invention specifically discloses a steel reinforcing element useful in the reinforcement of rubber articles in which the steel reinforcing element is provided with an adhesive coating comprising a ternary iron-brass alloy containing about 55 percent to about 75 percent by weight copper, about 15 to about 45 percent zinc, and about 0.1 percent to about 10 percent by weight iron. This invention also reveals a rubber article containing at least one steel reinforcing element wherein the steel wire is provided with an adhesive coating comprising a ternary iron-brass alloy containing about 55 percent to about 75 percent by weight copper and about 0.1 percent to about 10 percent by weight iron and about 15 to about 45 percent by weight zinc.

This invention demonstrates that the presence of small amounts of iron in brass alloys used to coat steel reinforcing elements in rubber articles greatly improves the adhesion properties between the metal reinforcing element and the rubber. The ternary iron-brass alloys described herein are of particular value for coating steel reinforcement elements for use in tires.

DETAILED DESCRIPTION OF THE INVENTION

Rubber articles quite frequently contain steel wire elements as structural reinforcements. Some examples of rubber articles that quite frequently contain steel wire reinforcing elements include tires, power transmission belts, conveyor belts, hoses, and a wide variety of other manufactured rubber products and component parts. Such rubber articles are actually composites containing a rubber portion and a metal portion. The rubber in the composite articles of this invention can be selected from a wide variety of rubbery polymers. Some rubbers commonly used in the compositions of this invention include natural rubber, styrene butadiene rubber, synthetic polyisoprene, polybutadiene, nitrile rubbers, carboxylated nitrile rubbers, butyl rubbers, ethylene-propylene-diene rubbers (EPDM), ethylene-propylene rubbers (EPR), and polyisobutylene.

Many terms are used to describe the steel reinforcing elements used to strengthen rubber compositions. The terms "cord", "tire cord", "cable", "strand", "wire", "rod", "plate", and "filament" can all be used to describe steel reinforcing elements used to strengthen rubber articles. The term "steel element" as used herein is devised to be generic to all articles for reinforcing rubber articles including those listed above. Thus, without being limited hereto, a steel element can be a steel wire, a steel cord, a steel tire cord, a steel cable, a steel strand, a steel rod, a steel plate, a steel wire, or a steel filament.

The term "steel" as used in the present specification and claims refers to what is commonly known as carbon steel, which is also called high-carbon steel, ordinary steel, straight carbon steel, and plain carbon steel. An example of such a steel is American Iron and Steel Institute Grade 1070-high-carbon steel (AISI 1070). Such steel owes its properties chiefly to the presence of carbon without substantial amounts of other alloying elements. Brass is an alloy of copper and zinc which can contain other metals in varying lesser amounts. The ternary alloys employed as coatings in this invention are iron-brass alloys since they contain 0.1 to 10 percent iron.

The rubber articles of this invention can be produced by following a procedure which comprises: (1) coating the metal reinforcement with the ternary iron-brass alloy of this invention, (2) surrounding the metal reinforcement with a rubber to conform to the desired shape of the rubber article being produced, and (3) curing (vulcanizing) the rubber article. The rubber articles of this invention differ from ordinary rubber articles in that they are provided with reinforcing steel elements which are coated with a ternary iron-brass alloy containing about 0.1 to about about 10 percent iron.

The ternary iron-brass alloys of this invention which are used as adhesive coatings for steel reinforcing elements used to reinforce rubber articles normally contain from about 55 percent to about 75 percent by weight copper, from about 15 percent to about 45 percent by weight zinc, and from about 0.1 to about 10 percent by weight iron. It is generally preferred for the ternary iron-brass alloys of this invention to contain from 60 to 67 percent by weight copper, from 28 to 39 percent by weight zinc, and from 1 to 5 percent by weight iron. It is generally more preferred for the ternary alloys of this invention to contain 2 to 4 percent by weight iron with the most optimum amount of iron being about 3 percent by weight.

In general, the metal reinforcing elements of this invention should be coated to a final thickness (after drawing) of from about 0.05 microns to about 0.40 microns with a ternary iron-brass alloy as was specified above. The ternary iron-brass alloy coatings of this invention preferably have a final thickness of from 0.12 microns to about 0.25 microns.

Numerous techniques can be employed to coat steel reinforcing elements with the ternary iron-brass alloys of this invention. Actually the ternary alloys of this invention can be coated onto steel elements by using any technique that will result in a coating layer of desired thickness and compositions. One means of effectuating the coatings of this invention is to dip the steel element which is desired to be coated into a molten bath of the ternary iron-brass alloy. A more practical technique for applying the ternary iron-brass alloy to steel elements is to electroplate layers of copper, zinc, and iron onto the steel element followed by heating the steel element to a temperature high enough to promote the diffusion of the copper, zinc, and iron (at least 450° C.) The copper, zinc, and iron layers can be electroplated onto a steel element in any order. It has been found to be convenient to first apply a copper layer, then to apply an iron layer, and finally to apply a zinc layer as the final step in the electroplating process. The copper, zinc, and iron layers should be electroplated onto the steel element in the proportion that it is desired for them to represent in the ternary iron-brass alloy coating.

Numerous electroplating techniques can be employed to deposit the copper, zinc, and iron layers onto the steel elements of this invention. A copper layer can be electroplated onto a steel element utilizing a plating solution containing copper cyanide or copper pyrophosphate. A copper pyrophosphate electroplating solution typically contains about 22 to 38 grams of copper ion per liter and 150 to 250 grams of $P_2O_7$-ions per liter (the ratio of $P_2O_7$-ions to copper ions is from about 6 to 8) with the pH of the solution being in the range of from about 8 to about 9.3. The pH of such a solution can be kept in this range by the addition of an alkaline aqueous solution of potassium hydroxide or with pyrophosphoric acid ($H_4P_2O_7$). It is generally preferred for copper pyrophosphate electroplating solutions to contain about 31 grams of copper ion per liter and about 210 grams of $P_2O_7$-ion per liter with the pH of the solution being about 8.8 to about 9.2. Copper is generally electroplated onto steel elements from copper pyrophosphate plating solution utilizing a current density of about 8 to about 18 amps per square decimeter at a temperature of about 50° C. to about 60° C.

Numerous electroplating solutions can be employed for depositing a zinc layer onto steel reinforcing elements. Some representative examples of such aqueous solutions include solutions of zinc cyanide, zinc sulfate, zinc chloride, zinc fluoroborate, and zinc pyrophosphate. A typical zinc sulfate electroplating solution will contain from about 40 to about 90 grams of zinc-ion per liter of solution and have a pH of about 1 to about 4.5. A more preferred zinc sulfate electroplating solution will contain about 80 grams of zinc-ion per liter of solution and have a pH of about 3 to about 3.7. Zinc layers are generally deposited from such zinc sulfate electroplating solution utilizing a cathode current density of about 20 to about 30 amps per square decimeter at a temperature ranging from about 16° C. to about 28° C. with ambient temperature normally being preferred.

Some representative examples of electroplating solutions that can be used to deposit an iron layer on a steel element include: iron chloride solutions, iron sulfate solutions, iron fluoroborate solutions, and ferrous ammonium sulfate solutions. A typical ferrous ammonium sulfate electroplating solution will contain about 45 to about 55 grams of iron ions per liter of solution and will have a pH ranging from about 2 to 4. Electroplating with such ferrous ammonium sulfate solutions is generally conducted utilizing a cathode current density of about 1 to 10 amps per square decimeter at a temperature ranging from about 16° C. to about 28° C. with ambient temperature normally being preferred.

The three distinct layers of copper, iron, and zinc that are formed in a sequential electroplating process can be diffused together to form a ternary brass alloy by simply heating the steel element on which they are deposited to a temperature of at least 450° C., preferably about 500° C. for a few seconds (about 2 to about 10 seconds). Typically, ternary iron-brass steel reinforcing wire is further drawn to the final desired filament diameter.

Steel elements that are coated with the ternary brass alloys of this invention can be assembled into rubber articles by using standard techniques well-known to those skilled in the art for assembling ordinary steel reinforcing elements into such rubber articles. In other words, the ternary iron-brass alloy coated steel reinforcing elements of this invention can be incorporated into rubber articles by using the same techniques that are employed in incorporating ordinary steel reinforcing elements or ordinary brass coated steel reinforcing elements into rubber articles. Generally, such steel elements are simply surrounded by uncured rubber in a mold and vulcanized to produce the desired rubber article. Such uncured rubber normally contains various compounding ingredients including: sulfur, accelerators, antioxidants, fillers, carbon black, processing oils, etc.

The present invention will be described in more detail in the following examples. These examples are merely for the purpose of illustration and are not to be regarded as limiting the scope of the invention or the manner in which it may be practiced. Unless specifically indicated otherwise, all parts and percentages are given by weight.

EXAMPLES 1 THROUGH 3

A series of steel cords was electroplated in an aqueous solution of copper pyrophosphate containing about 31 grams of copper ions per liter of solution and about 210 grams of $P_2O_7$-ions per liter of solution utilizing a cathode current density of about 8 to 18 amps per square decimeter at a pH of about 9 and a temperature of about 50° C. The steel cords were then electroplated in an aqueous ferrous ammonium sulfate solution (except for the controls wherein no iron was plated onto the steel cords) containing about 50 grams of iron ions per liter of solution utilizing a cathode current density of 1 to 10 amps per square decimeter at a pH of about 3 and a temperature of about 22° C. The amount of iron deposited onto the steel cords was controlled by adjusting the amperage. A layer of zinc was then electroplated onto the steel cords from an aqueous zinc sulfate solution containing about 80 grams of zinc per liter of solution at a pH ranging from about 3 to about 3.7 and a temperature of about 22° C. These plated steel cords were then passed through a heat diffusion oven at 500° C. for a duration of 2.5 seconds. The steel cords were then air cooled at ambient temperature for about 10 seconds followed by a quench in a water bath which was at 15° C. The amounts of copper, zinc, and iron in the resulting ternary brass alloy coatings are shown in Table I. These steel cords were then embedded in an uncured natural rubber containing: 2 parts of stearic acid, 10 parts of zinc oxide, 1 part of an amine antioxidant, 3 parts of sulfur, 1 part of an accelerator, and 55 parts of carbon black per 100 parts of the natural rubber. These rubber articles were then cured at 163° C. (323° F.) for 16 minutes. The steel cords in these rubber compositions were then subjected to a pull-out test according to ASTM Standard D2229-73. The results of these pull-out tests are given below in Table I as original adhesion which is expressed in Newtons.

A series of these samples (cured blocks) were immersed in an aqueous salt solution containing 5 percent sodium chloride at 32° C. (90° F.) and allowed to remain in the solution for a period of 3 days. These samples were then removed from the salt solution and subjected to the pull-out test. The results of these pull-out tests are shown in Table I as salt aged adhesion. Another series of uncured samples was humidity aged for 10 days at a relative humidity of 93 percent and a temperature of 38° C. (100° F.). After the completion of this humidity aging the samples were cured and subjected to the pull-out test with the results of this test being shown in Table I as humidity aged adhesion.

TABLE I

| | Brass Alloy Composition | | | Adhesion (Newtons) | | |
|---|---|---|---|---|---|---|
| Example | % Fe | % Cu | % Zn | Original | Salt Aged | Humidity Aged |
| 1 | 0 | 65 | 35 | 257 | 201 | 202 |
| 2 | 1 | 65 | 34 | 267 | 240 | 197 |
| 3 | 3 | 63.5 | 33.5 | 285 | 250 | 226 |

As can be readily determined by examining Table I; original adhesion, salt aged adhesion, and humidity aged adhesion are all unexpectedly and significantly improved by the presence of iron in these brass alloy coating compositions. In the "salt aged adhesion test" almost a 25 percent increase in adhesion was observed in Example 3, wherein the brass coating contained 3 percent iron, over the adhesion observed in Example 1, which was the control with no iron being in its brass alloy coating.

EXAMPLES 4 THROUGH 6

The same procedure that was specified for Examples 1 through 3 was utilized in these examples except that the uncured rubber used contained 5 phr (parts per hundred parts of rubber) of sulfur in stead of 3 phr of sulfur which was utilized in Examples 1 through 3. The results of these pull-out tests are given in Table II.

TABLE II

| | Brass Alloy Composition | | | Adhesion (Newtons) | | |
|---|---|---|---|---|---|---|
| Example | % Fe | % Cu | % Zn | Original | Salt Aged | Humidity Aged |
| 4 | 0 | 65 | 35 | 315 | 188 | 226 |
| 5 | 3 | 63.5 | 33.5 | 329 | 211 | 268 |
| 6 | 5 | 62.5 | 32.5 | 323 | 214 | 271 |

As can be seen by examining Table II the presence of iron in these brass alloy coatings again significantly improved adhesion.

EXAMPLES 7 THROUGH 9

The same procedure that was specified for Examples 4 through 6 was repeated here except that the rubber compositions were vulcanized utilizing a high temperature cure at 177° C. (350° F.) for a period of 8.5 minutes. The results of these experiments are shown in Table III.

TABLE III

| | Brass Alloy Composition | | | Adhesion (Newtons) | | |
|---|---|---|---|---|---|---|
| Example | % Fe | % Cu | % Zn | Original | Salt Aged | Humidity Aged |
| 7 | 0 | 65 | 35 | 297 | 205 | 246 |
| 8 | 1 | 65 | 34 | 318 | 192 | 230 |
| 9 | 3 | 63.5 | 33.5 | 325 | 221 | 286 |

As can be determined by reviewing Table III, the presence of 3 percent iron in these brass alloy coatings significantly improved original adhesion, salt aged adhesion and humidity aged adhesion (compare Example 9 with Example 7 which was a control that did not contain any iron in its brass alloy coating). These examples clearly demonstrate that the presence of iron in brass alloys used to coat steel reinforcing elements can significantly improve rubber to metal adhesion properties.

While certain representative embodiments and details have been shown for the purpose of illustrating this invention, it will be apparent to those skilled in this art that various changes and modifications can be made herein without departing from the scope of this invention.

What is claimed is:

1. In a rubber article containing at least one steel reinforcing element wherein said steel reinforcing element is provided with an adhesive brass alloy coating, the improvement which comprises said brass alloy being a ternary iron-brass alloy consisting essentially of about 55 percent to about 75 percent copper by weight, about 0.1 percent to about 10 percent iron by weight, and about 15 percent to about 45 percent zinc by weight.

2. A rubber article as specified in claim 1 wherein said ternary iron-brass alloy consisting essentially of about 60 percent to 67 percent copper by eight, about 1 percent to 5 percent iron by weight, and about 28 percent to 39 percent by weight zinc.

3. A rubber article as specified in claim 2 wherein said ternary iron-brass alloy contains 2 percent to 4 percent by weight iron.

4. A rubber article as specified in claim 3 wherein said ternary iron-brass alloy contains about 3 percent by weight iron.

5. A rubber article as specified in claim 1 wherein said adhesive iron-brass coating has a thickness of from about 0.05 microns to about 0.40 microns.

6. A rubber article as specified in claim 5 wherein said adhesive iron-brass coating has a thickness ranging from 0.12 microns to 0.25 microns.

7. A rubber article as specified in claim 1 wherein said rubber is selected from the group consisting of natural rubber, synthetic polyisoprene, polybutadiene, nitrile rubber, carboxylated nitrile rubber, butyl rubber, EPDM, EPR, and polyisobutylene.

8. A rubber article as specified in claim 7 wherein said rubber is natural rubber.

9. A rubber article as specified in claim 1 wherein said steel reinforcing element is selected from the group consisting of steel wires and steel cord.

10. A rubber article as specified in claim 1 in the form of a tire.

11. A rubber composition as specified in claim 1 in the form of a belt.

12. A steel reinforcing element useful in the reinforcement of rubber articles in which the steel reinforcing element is provided with an adhesive coating comprising a ternary iron-brass alloy consisting essentially of about 55 percent to about 75 percent by weight copper, about 0.1 percent to about 10 percent by weight iron, and about 15 percent to about 45 percent by weight zinc.

13. A steel reinforcing element as specified in claim 12 wherein said ternary iron-brass alloy consisting essentially of about 60 percent to about 67 percent by weight copper, about 1 percent to about 5 percent by weight iron, and about 28 percent to about 39 percent by weight zinc.

14. A steel reinforcing element as specified in claim 13 wherein said ternary iron-brass alloy contains from 2 percent to 4 percent by weight iron.

15. A steel reinforcing element as specified in claim 14 wherein said ternary iron-brass alloy contains about 3 percent iron.

16. A steel reinforcing element as specified in claim 12 wherein said adhesive iron-brass coating has a thickness ranging from about 0.05 microns to about 0.40 microns.

17. A steel reinforcing element as specified in claim 16 wherein said adhesive iron-brass coating has a thickness ranging from 0.12 microns to 0.25 microns.

* * * * *